May 9, 1933.  W. O. HEBLER  1,907,540
TEMPERATURE INDICATING DEVICE
Filed July 20, 1931
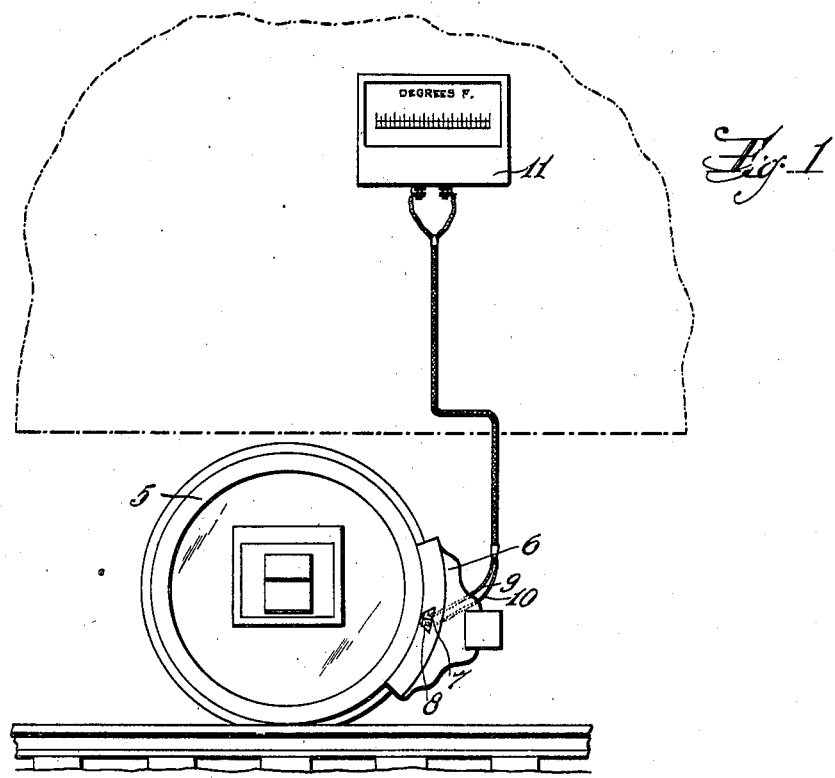
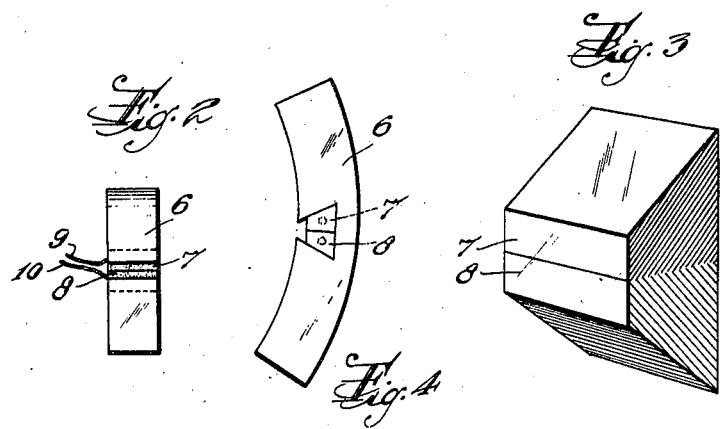

Patented May 9, 1933

1,907,540

UNITED STATES PATENT OFFICE

WILLIAM O. HEBLER, OF NEWARK, NEW JERSEY, ASSIGNOR TO CHARLES ENGELHARD, INC., OF NEWARK, NEW JERSEY, A CORPORATION OF NEW JERSEY

TEMPERATURE INDICATING DEVICE

Application filed July 20, 1931. Serial No. 551,920.

This invention relates to temperature indicating devices, and more particularly to devices for remotely indicating the temperature of railway car brakes.

During the breaking of railway cars, considerable heat is generated, the amount of heat depending mainly upon the speed and weight of the cars. A sudden application of the brakes will cause a rapid generation of heat and an abnormal rise in temperature of the brake shoes and wheels, while a gradual application of the brakes allows more time for dissipation of the generated heat, and consequently a normal and safe rise in temperature.

In order to ascertain the proper method of braking railway cars, and also to ascertain when a brake shoe may be faulty or dragging, it is desirable that means be provided for determining the temperature of the brake shoes under various conditions.

Heretofore, temperatures have been determined by thermometers, or thermo-couples positioned at various points in the braking mechanism. But such methods have been unsatisfactory in that a true average temperature is not obtained, the thermo-couples indicating only the temperatures of the points at which they are positioned.

Also, complicated and expensive equipment such as a ring brush contact arrangement has been used. But such equipment causes considerable error because of the variable contact between the brush and the ring.

It is an object of this invention to provide a simple thermo-couple arrangement to accurately indicate remotely an average of temperature across a brake shoe.

A further object is the provision of an inexpensive and accurate device including a single thermo-couple to determine the heat evolved by the pressure of a brake shoe against a wheel during the braking operation.

These and other advantageous objects, which will later appear, are accomplished by the simple and practical construction and arrangement of parts hereinafter described and exhibited in the accompanying drawing, forming part hereof, and in which:

Figure 1 represents an elevational view showing my device applied to a railway car brake shoe.

Figure 2 represents a front view of a brake shoe carrying a thermo-couple.

Figure 3 represents a perspective view of a thermo-couple element.

Figure 4 represents a side view of the brake shoe and thermo-couple.

Referring to the drawing, there is shown a railway car wheel 5, and brake shoe 6, of standard construction. The brake shoe 6 has a dove-tailed recess or groove in its bearing face, and positioned in the recess or groove is the hot junction of a thermo-couple. The hot junction comprises a plate 7 of iron and a plate 8 of constantan, the plates being welded together to form a solid piece.

The plates are secured in the recess in the brake shoe in any suitable manner and iron and constantan wires 9 and 10 are welded respectively to the iron and constantan plates the wires leading to the cold junction of the thermo-couple, which may be positioned in the indicating instrument 11, preferably a milli-voltmeter calibrated to read directly in degrees of temperature.

It will be seen that the hot junction plates 7 and 8 cover a considerable area of the brake shoe, and preferably extend across the face of the shoe. By this arrangement, the heat of many points on the brake shoe is transmitted to the plates 7 and 8, and an average temperature is indicated.

Preferably, each brake shoe should be provided with a thermo-couple element as described, and by means of suitable indicator and switching arrangements the temperature of any wheel on a train may be quickly ascertained. Dragging brake shoes and hot boxes are readily indicated, as well as improper application of the brakes.

In addition to the advantage of obtaining an average temperature with a single thermo-couple, my arrangement may be installed at a very low cost and is capable of greater accuracy than devices heretofore used for similar purposes.

The foregoing disclosure is to be regarded as descriptive and illustrative only, and not as restrictive or limitative of the invention, of which obviously an embodiment may be constructed including many modifications without departing from the general scope herein indicated and denoted in the appended claim.

Having thus described my invention, what I claim as new and desire to secure by Letters Patent, is:

A railway car wheel brake shoe having a dove-tailed groove in and extending across its bearing face, a thermo-couple having a hot junction consisting of two plates of different metals welded together said hot junction being dove-tailed in cross-section, said plates being positioned in the recess, and means connected with the thermo-couple to indicate the temperature of the brake shoe.

This specification signed this 26th day of June, 1931.

WILLIAM O. HEBLER.